United States Patent [19]

Gerbel

[11] Patent Number: 4,807,908

[45] Date of Patent: Feb. 28, 1989

[54] BALLOT FOR USE IN AUTOMATIC TALLYING APPARATUS

[75] Inventor: Jack Gerbel, Piedmont, Calif.

[73] Assignee: Business Records Corporation, Dallas, Tex.

[21] Appl. No.: 20,602

[22] Filed: Mar. 2, 1987

[51] Int. Cl.[4] .................. B42D 15/00; B42D 5/02; G09B 5/00; G09B 7/06

[52] U.S. Cl. .................................. 283/5; 283/74; 283/48.1; 434/306

[58] Field of Search ............... 283/1 R, 1 A, 5, 48 A, 283/48 R, 74; 235/61.12 R, 51, 57, 490; 250/566; 434/306, 363

[56] References Cited

U.S. PATENT DOCUMENTS

| | | | |
|---|---|---|---|
| 1,188,342 | 6/1916 | Barton | 283/48 A |
| 1,404,611 | 1/1922 | Hoag | 283/5 |
| 1,410,984 | 3/1922 | Baker | 283/48 R |
| 2,190,019 | 2/1940 | Foster | 283/5 |
| 3,634,953 | 1/1972 | Shannon | 434/363 |
| 3,886,326 | 5/1975 | Horvath et al. | 434/363 |
| 4,317,030 | 2/1982 | Berghell | 283/74 |
| 4,641,240 | 2/1987 | Boram | 434/306 |

Primary Examiner—Paul A. Bell
Assistant Examiner—Paul M. Heyrana
Attorney, Agent, or Firm—Balogh, Osann, Kramer, Dvorak, Genova & Traub

[57] ABSTRACT

A ballot consisting of two or more ballot cards is held together by means of perforated creases. The resulting ballot is printed in columns and rows entirely on one side representing a similar ballot format as presented to the voter on the face of the mechanical or fully electronic machine used in that election jurisdiction. Positions for write-in candidates would normally appear on the back of the ballot. After the ballot cards are punched or marked by the voter, they ar detached from each other. The ballot cards are then machine read and tallied. One end of the ballot cards may be provided with a receipt stub attached thereto by a perforated crease. The receipt stub may be given to the voter for record purposes. Unique pre-punched holes or marks on each card of the total ballot identify to the card reading equipment which part of the total ballot is being processed.

9 Claims, 1 Drawing Sheet

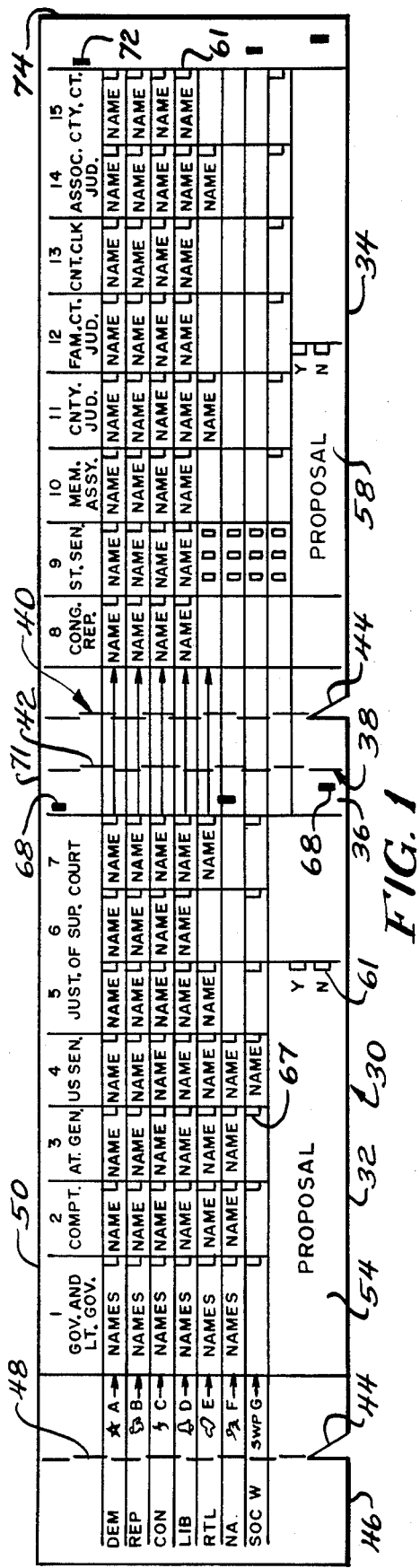
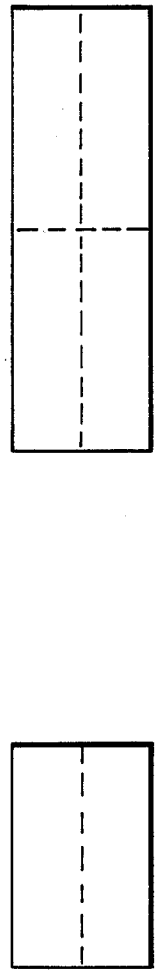
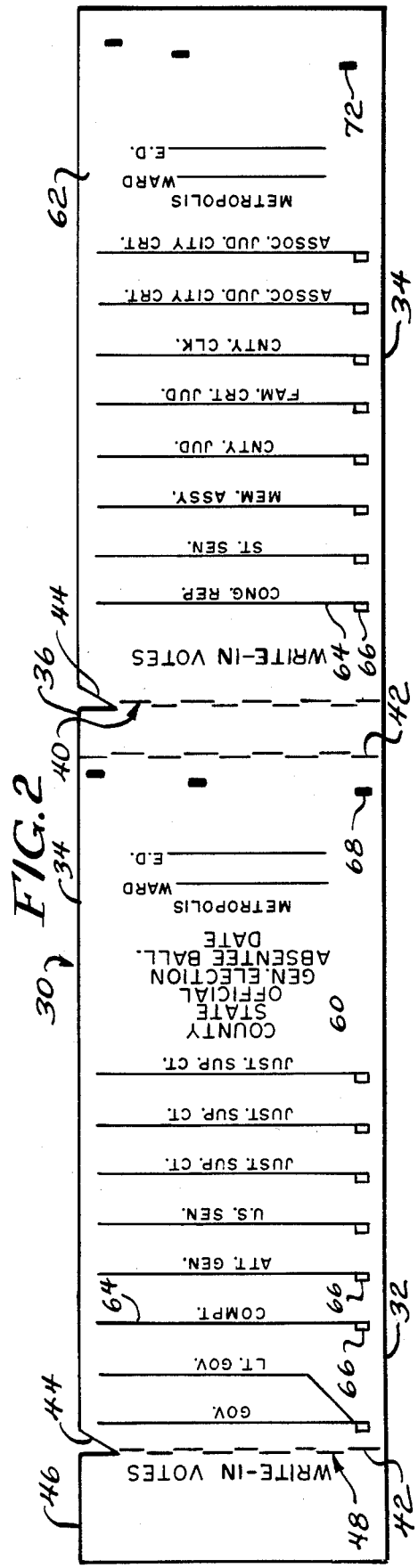
FIG. 1  FIG. 2  FIG. 3  FIG. 4

BALLOT FOR USE IN AUTOMATIC TALLYING APPARATUS

FIELD OF THE INVENTION

This invention relates generally to improvements in a ballot for use in an automatic vote tallying or counting apparatus and to a method of forming such an improved ballot.

DESCRIPTION OF THE PRIOR ART

There are many forms of electron ballots that have been prepared for overcoming one or more disadvantages in earlier existing ballots. For example, U.S. Pat. No. 1,404,611 describes a balloting system which uses a perforated card, wherein the perforations may be connected by slots to facilitate counting of such ballots by segregating means such as a probe in the form of a needle. Making of such a ballot with a slot to interconnect adjoining holes adjacent a particular candidate's name appearing thereon is cumbersome.

Another form of a ballot has been described in U.S. Pat. No. 2,190,019, wherein two columns of spaced holes are used to define a list of candidates, one column of the holes being covered by tabs. The name of a particular candidate is selected by tearing away the tab to thereby disclose two spaced holes, which are then used for counting purposes.

Also available on the market, are different forms of electro-mechanical and electronic vote-tallying machines which are adapted to read marked ballots as they are inserted and passed through the machines.

A common disadvantage of the foregoing known ballots is that only a limited amount of information by printing the titles of offices, names of candidates, and referenda on one face or side of the ballot can be presented to the voter. If there are a large number of candidates vying for positions in a popular general electron, it is necessary to present two or more ballots, which presently would require two or more separate cards for each voter. For example, one ballot may contain the names of candidates running in national and statewide elections, while another ballot may have a list of candidates running for county and manicipal positions and a third may include all referenda information printed thereon. Some voters may be confused and only vote on one of the cards and disregard the others. Also, each of the ballots has to be positioned in a ballot-holding device so that the ballot may be properly punched or marked in selecting the desired candidates. Sometimes, the voter will forget to place the multiple ballots in the ballot-holding device and fail to vote on the additional ballots.

SUMMARY OF THE INVENTION

To overcome the various disadvantages of the different forms of ballots, an improved ballot is provided. The ballot is made from a sheet of stiff material, such as a paper card, which may also be subdivided into two or more ballots and one or more stubs held together by perforated creases. The names of the political parties and the names of the candidates running for the various offices are distributed either horizontally or vertically along the ballot. The offices for which such candidates are running are also correspondingly distributed either vertically or horizontally along the ballot. Under, or adjacent to all the candidates for a particular office, or on the reverse side of the card is a space which is provided for the recording of write-in votes by the voter. Also, there is an identification of the governmental office issuing the ballots on either the front side or the reverse side of the ballots.

The ballot encompasses two or more electronically processible cards. They are held together as a single ballot through the use of vertical and/or horizontal perforations and/or stubs. These ballots may be either punched or marked to record a choice by the voter. Each ballot card of the ballot may contain small pre-perforated marking positions adjacent to a candidate's name, a party's name or adjacent to a referendum proposal which could be punched out or marked by perforating to register a voter's choice.

An alternative method would be to use a non-pre-perforated ballot having marking positions adjacent to a candidate's name, a party's name or a referendum proposal. Under this method, a voter must mark with a pencil or pen or other marking instrument to register a selected choice.

Each of the ballot cards may be of a different size. However, it is preferred that the ballot cards be of the same size. Although punch cards and optically-read marked ballots are not new, the ballot is very unique in that two or more ballot cards are attached together to form one complete ballot which, to the voter, appears to be a single document.

Each card of the ballot contains a coded punch or mark to indicate its relative position in the complete ballot. Each ballot card may include a "corner-cut" to assure proper positioning before being tabulated. When the votes are to be tabulated, the ballot cards are separated along vertical and/or horizontal perforated creases, and any stub which links the two ballot cares together is discarded. Also, if a receipt stub is incorporated in the ballot, the receipt is tendered to the voter prior to placing the ballot into a ballot box.

All the ballot cards are then tabulated in general purpose and/or special purpose computers utilizing card readers. The results are then printed in various formats and groupings.

Another unique feature is the layout of the printing on the ballot. For the first time, this allows for the entire ballot to be printed in a matrix or form such as is used on mechanical or fully electronic voting machines. The extra elongated ballot enables the complete ballot format to be seen at one time, on one side of the ballot, similar to a mechanical or fully electronic machine, with ample space to identify the parties and the candidates as well as the office titles to be voted on. Proposition wording, special instructions, party symbols, candidate position numbers, date and jurisdiction of the election, and other pertinent information may be included on one or both sides of the ballot.

Another advantage of using an elongated ballot is in the area of absentee voting. For those who are unable to vote in person at the polling place in their own districts, prior to the election date, absentee ballots are made available in person or are mailed to qualified voters to be properly marked and then returned to the Election Commissioners. Upon return, the absentee ballots are separated into individual cards and are machine tabulated instead of being tabulated by hand as was done under the old practice.

In addition, these ballots may be used for voting in polling places if the intended voting equipment breaks down. Voters whose right to vote is challenged may also use this ballot, if permitted by state law.

The improved ballot also features a line (or lines) for each office so that a voter may insert a write-in name for each office position to be filled. Each line is provided with a unique marking position. The tabulating apparatus is set up to reject a vote for a particular office if selections made by the voter (including write-ins) are greater than the number to be elected.

The main object of the invention is:
(1) to provide a ballot having two or more ballot cards linked together by perforated creases with each other and/or through one or more stubs.
(2) to provide a mechanical or fully electronic machine formatted ballot having all official printed office titles, candidates names, or referenda on one side or face of the ballot device.

BRIEF DESCRIPTION OF THE DRAWINGS

The invention will now be described in conjunction with the following drawings, wherein:

FIG. 1 illustrates the front side of a ballot having two integral ballot cards separable by a transverse perforation;

FIG. 2 illustrates the reverse side of the ballot;

FIG. 3 illustrates a ballot having two ballot cards separable by a longitudinal perforation; and FIG. 4 illustrates a ballot having four adjoining ballot cards separable by transverse and longitudinal perforations.

DESCRIPTION OF AN ADAPTATION OF ONE OF THE PRINCIPLE STYLES

Referring to FIG. 1, there is shown a ballot (30) comprising a pair of ballot cards (32) and (34) interconnected by a stub (36) which foldably maintains the two ballot cards with perforated creases (38) and (40) which have elongated perforations (42). In most situations, the stub (36) will not be present and the ballot cards are integrally formed, but separable by a perforated crease such as 38. Each of the ballot cards is provided with a corner-cut (44) for orientation purposes.

Since it is sometimes customary to provide a voter with proof of voting, a receipt stub (46) is foldably attached by a perforated crease (48) to the ballot card (32).

As shown in FIG. 1, an end portion (50) of the ballot (30) contains a list of all political parties who are participating in the election. Each of the ballot cards is provided with columns, each of which identifies the office and a series of candidates' names who are running for that office. For example, ballot card (32) has five different offices, and ballot card (34) sets out seven offices.

In addition to the candidates' names, ballot card (32) has a portion (54) setting out a proposal to be voted by the voters. Similarly, ballot card (34) has a portion (58) containing an additional proposal. As shown in FIG. 1, the ballot (30) has a front side (60). After each name and after each proposition, there is a pre-perforated position (61) which can be punched out by the voter by using an instrument to complete the perforation. Using an alternate method, when a pre-perforated position is not used, marking may be effected with a writing instrument in the proper position.

A reverse side (62) of the ballot (30) is shown in FIG. 2 and is used for write-in votes. A number of lines (64) extend transversely across the length of the ballot (30). Each of the lines is identified with a column (political office) set out on the obverse side of the ballot. Adjoining each line (64) is a marking position (66) located along the margin of the ballot. The marking spaces (66) being located in the margin, will not interfere with any of the marking spaces shown on the obverse side (60) of the ballot (30). The marking spaces (66) are, of course, pre-perforated like the marking spaces shown on the obverse side (60) of the ballot (30).

The ballot card (32) contains coding holes or marks (68) adjacent to its end (71) and the ballot card (34) contains coding holes or marks (72) adjacent to its end (74). The positioning of the holes or marks on both of the ballot cards differs positionally so that, when the cards are fed into a reading machine, the reading machine will identify the card as to the offices listed on that card.

It has been previously described that a receipt stub (46) can be attached to the ballot card (32). However, it is apparent that the addition of a further stub is not necessary.

In the particular embodiment of the ballot used in actual elections, the width of the ballot (30) was three and one-quarter inches, and the length of each ballot card (32) and (34) was seven and three-eights inches. The stub (36) had a width of nine-sixteenths of an inch, and the receipt stub (46) had a width of one and one-eighth inches.

As was previously mentioned, on the front side of the card, at the bottom of each column listing an office, there is provided an empty space for accepting a write-in vote. Also, on the reverse side of the card, there are provided a series of lines associated with particular offices for accepting write-in votes.

The procedure for marking a ballot to introduce a "write-in candidate's name" is as follows:

Assuming that the voter wants to write in a candidate's name for the position of Attorney General in Column 3 on the front side of the ballot card 32, the voter would write in the name at the bottom of Column 3 and then turn over the ballot card 32 to show its reverse side and write in the candidate's name on the line identified as "ATT. GEN.". Also, the voter would mark or punch the marking position 66 associated with the line "ATT. GEN." in the left-hand margin on the card 32. Thereafter, during tallying, the ballot cards 32 and 34 would be separated and fed into reading apparatus which, upon detecting the marking in the margin of the ballot card 32, would eject the ballot card 32 for manual processing by an election clerk, who would then tally a vote for the particular write-in candidate on a separate piece of paper. For additional verification of a "write-in" candidate, the voter can also mark a space 67 appearing after the write-in name on the last line in Column 3 on the front face 60 of the ballot card 32.

Other modifications of the present invention within the scope of the appended claims may be made without departing from the spirit of the invention. An example of this would be if most of the printing were turned 90 degrees to the ballot used in previous elections.

What is claimed is:

1. An election ballot for processing by a vote selection scanning apparatus which feeds information to a tallying machine programmed to properly allocate the vote selection to the proper classification, said ballot comprising two or more inter-connected ballots cards foldably delineated from each other by perforated creases, a front side of said ballot bearing a selection of choice designations in the form of names of political parties, official positions, and candidates' names extending longitudinally along throughout said ballot, a marking position associated with each choice designation, a reverse side of said ballot having a plurality of write-in lines extending transversely of said ballot, a punching or marking position associated with each choice designation and being disposed in one longitudinal margin of said ballot, corner cut means for positionally identifying each ballot card so that it can be processed properly, and additional punched holes or marked positions on each ballot card for identifying official positions on one ballot card from official positions on the other ballot card during tallying.

2. An election ballot according to claim 1, wherein said marking positions are pre-perforated positions.

3. An election ballot according to claim 1, wherein said marking positions are optically read response positions.

4. An election ballot according to claim 1, including a further member foldably delineated from an end of one of said ballot cards by a perforated crease and defining a voter's receipt.

5. An election ballot according to claim 1, wherein each of said write-in lines is identified by a reference number and/or office title associated with a similarly numbered office listed on the front side of said ballot.

6. An election ballot according to claim 1, wherein the printing on the front side is arranged in such a manner as to display office titles, candidates names, party names and other pertinent data in a layout similar to mechanical or fully electronic voting machines used in the particular election jurisdiction.

7. An election ballot as claimed in claim 1, wherein said two or more ballot cards are inter-connected vertically.

8. An election ballot as claimed in claim 1, wherein said two or more ballot cards are inter-connected horizontally.

9. An election ballot as claimed in claim 1, wherein said two or more ballot cards are inter-connected both vertically and horizontally.

* * * * *